US010374401B1

(12) United States Patent
Dolgatch

(10) Patent No.: US 10,374,401 B1
(45) Date of Patent: Aug. 6, 2019

(54) DEVICE AND PROCESS FOR HOT STICKS FOR HIGH-TEMPERATURE APPLICATIONS

(71) Applicant: Miguel Koziol Dolgatch, Montevideo (UY)

(72) Inventor: Miguel Koziol Dolgatch, Montevideo (UY)

( * ) Notice: Subject to any disclaimer, the term of this patent is extended or adjusted under 35 U.S.C. 154(b) by 0 days.

(21) Appl. No.: 15/958,015

(22) Filed: Apr. 20, 2018

(51) Int. Cl.

| | |
|---|---|
| ***H02G 1/02*** | (2006.01) |
| ***H01B 17/24*** | (2006.01) |
| ***H01B 3/42*** | (2006.01) |
| ***H01B 3/47*** | (2006.01) |
| ***H01B 17/66*** | (2006.01) |
| ***H01B 19/00*** | (2006.01) |
| *H01B 3/28* | (2006.01) |
| *H01B 17/32* | (2006.01) |
| *H01B 3/46* | (2006.01) |

(52) U.S. Cl.
CPC ............... *H02G 1/02* (2013.01); *H01B 3/427* (2013.01); *H01B 3/47* (2013.01); *H01B 17/24* (2013.01); *H01B 17/66* (2013.01); *H01B 19/00* (2013.01); *H01B 3/28* (2013.01); *H01B 3/46* (2013.01); *H01B 17/325* (2013.01)

(58) Field of Classification Search
CPC . H01B 3/28; H01B 3/427; H01B 3/46; H01B 3/47; H01B 17/24; H01B 17/325; H01B 17/66; H01B 19/00; H01H 31/006; H01H 85/0208; H02G 1/02
USPC ........................................................ 294/174
See application file for complete search history.

(56) References Cited

U.S. PATENT DOCUMENTS

| | | | | | |
|---|---|---|---|---|---|
| 1,045,679 | A * | 11/1912 | Cronin | H02G 1/04 | 174/138 D |
| 2,096,244 | A * | 10/1937 | Heinrich | H01B 17/22 | 140/117 |
| 3,688,017 | A * | 8/1972 | Roots | H01H 31/006 | 156/172 |
| 3,788,691 | A * | 1/1974 | McMullin | B25J 1/04 | 29/750 |
| 4,965,930 | A * | 10/1990 | Wnukowski | H02G 1/02 | 254/134.3 R |
| 6,453,776 | B1 * | 9/2002 | Beattie | H01R 13/53 | 294/174 |
| 8,714,525 | B2 * | 5/2014 | Lessard | H02G 1/04 | 254/134.3 PA |
| 2005/0167978 | A1 * | 8/2005 | Moses | E21B 17/085 | 285/223 |

* cited by examiner

*Primary Examiner* — Dean J Kramer
(74) *Attorney, Agent, or Firm* — Donald J. Ranft; Collen

(57) ABSTRACT

The device and process disclosed relates to hot sticks suitable for working on high voltage conductors in high temperatures. The enhanced hot sticks include a thermal insulating piece between the pole and the end tool. The disclosed hot stick retains electrical and mechanical properties at least as good as those of regular hot sticks and can be used on high temperature lines in the same way as regular hot sticks are presently used to perform live work on normal lines.

8 Claims, 3 Drawing Sheets

DEVICE AND PROCESS FOR HOT STICKS FOR HIGH-TEMPERATURE APPLICATIONS

BACKGROUND

Live work on high voltage installations is widely spread across utilities around the world because it provides efficiency, economy and safety. Hot sticks with different tools and pieces of hardware installed on their ends are used to perform Live Work. These hot sticks are made from tubes of fiberglass with epoxy resin and filled with foam. A few utilities still work with wooden hot sticks which are heavier and less reliable than epoxy ones.

Since more than a decade ago, some transmission lines have special conductors which operate in a high range of temperatures (180° C. to 250° C.), to increase their power transmission capacity. The problem that arises is that existing sticks cannot be used on high temperature conductor lines because they do not withstand the thermal conditions. Epoxy resin cannot be exposed to temperatures above 80° C. for extended periods of time because it degrades and loses its mechanical and electric properties. Wood reaches pyrolysis around 250° C.

SUMMARY OF THE INVENTION

This utility model relates to special hot sticks suitable for working on high temperature conductors. This enhanced hot sticks show electrical and mechanical properties at least as good as those of regular hot sticks and can be used on high temperature lines in the same way as regular hot sticks are presently used to perform live work on normal lines. So, by means of this invention it is possible to extend the benefits of live work to high temperature installations, which usually are the most critical parts of the networks.

DETAILED DESCRIPTION

In this section, a detailed description of one of the thermal insulation piece and possible methods for manufacturing the thermal insulation piece is included. Also, detailed instructions for the assembly of the complete set of pieces are provided.

Figure 1:
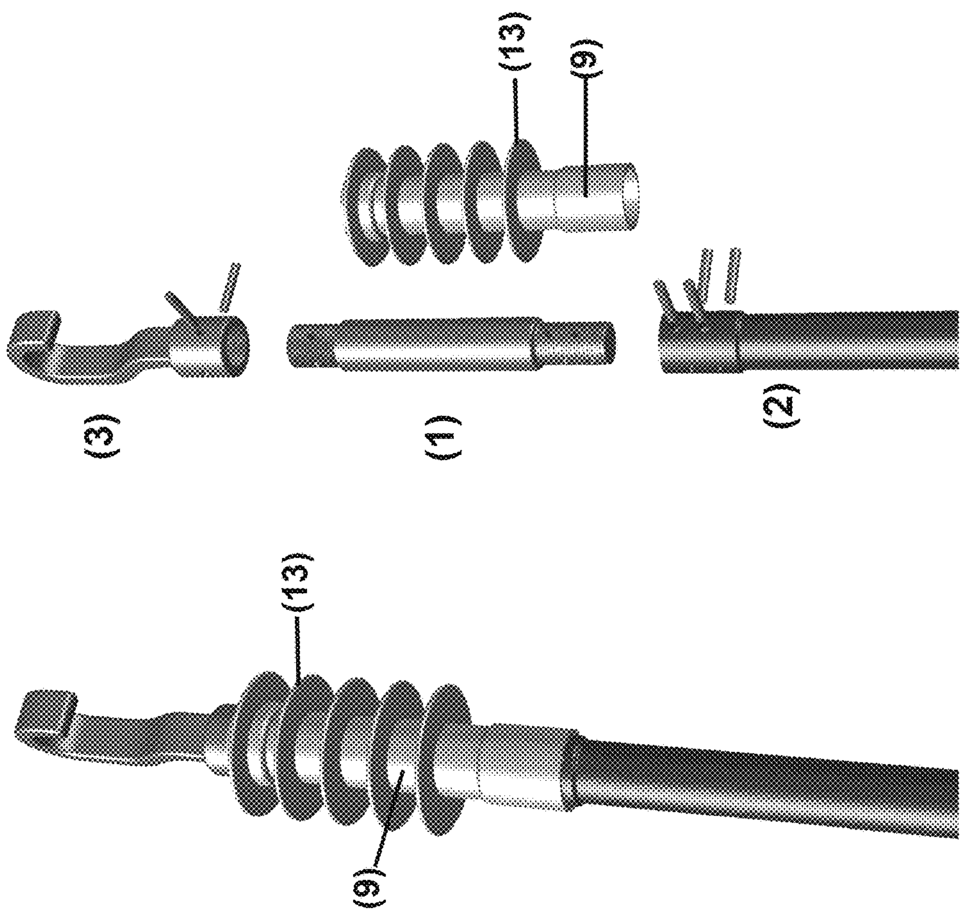
FIG. 1 is a general view and exploded view of the live side of the hot stick. The final hook is just one of several tools that may be used

The device consists basically of the interposition of a thermal insulating piece of stick, made from a material with appropriate mechanical, electrical and thermodynamic properties, between the usual fiberglass stick and the high voltage end tool. This tool is the piece that will make contact with the live and hot parts of the line. FIG. 1 shows the general view of a hot stick enhanced by the utility model and the different parts that make it up.

One of the basic issues is choosing the material for the thermal insulation piece (1), that is, the piece between the fiberglass foam filled tube (2) and the end tool (3) in FIG. 1.

Nowadays there is a wide variety of plastic materials with properties not even imagined some years ago. After analyzing the properties of many hi-tech plastics we found that the most suitable is Polyether Ether Ketone (PEEK) with 30% fiberglass reinforcement. PEEK is now the generic name of this thermoplastic material and it is manufactured among others by Victrex® and Ketron®.

PEEK is capable of working continuously at 250° C. and its mechanical properties exceed those needed for this purpose. From the electrical point of view, in the range of use PEEK is equivalent to a portion of fiberglass stick. Its thermal conductivity coefficient is high when compared with other hi-tech plastics, but anyway it is adequate. The percentage of water absorption of PEEK is much lower than the one of PAI (Polyamidimide), PBI (Polybenzimidazole) and PI (Polymide), and it is quite similar to the coefficient of glass reinforced epoxy. PEEK can be bought extruded or it can be molded. The final choice of the material to be used resides on the manufacturer of the composite hot sticks but we strongly recommend PEEK. From now on we will call PEEK the material used for the thermal insulation piece.

The other basic issue to be defined is the required length of the thermal insulation piece (1), this is, the length of the central smooth part of piece (1) seen in FIG. 1. From the well-known solution to the problem of heat transfer along a bar of constant profile it is possible to deduce that the length 1 of the bar necessary to withstand 250° C. in one extreme without raising the temperature in the other extreme above 80° C., assuming steady state and heat evacuation exclusively through the surface of the bar (natural convection), is given by the following formula:

$$l = \sqrt{\frac{\lambda f}{\alpha_f u}} \cdot L\left(\frac{\sqrt{v_1^2 - v_2^2} + v_1}{v_2}\right)$$

Where:

$\lambda$ Thermal conductivity of PEEK 0.43 W/m° K $\alpha_f$ Convection coefficient 5 W/m$^{2}$° C.

f Bar section area 0.00785 m$^2$ u Bar section perimeter 0.314 m $t_f$ Surrounding air temperature 40° C.

$v_1$ Extreme 1 temperature minus $t_f$ 250−40° C.=210° C.

$v_2$ Extreme 2 temperature minus $t_f$ 80−40° C.=40° C.

Even under the worst hypothesis: unlimited exposition to heat, lack of wind, maximal diameter of the stick (4 inches), air temperature of 40° C., the required length of PEEK is less than 11 cm. In practice a length of 20 to 25 cm is recommended.

The thermal insulation piece (1) holds the end tool (3). The union between both elements can be made in different ways. The end tool (3) consists of different metallic or plastic hardware pieces which are used directly on the power installation or to hold fixed or detachable tools. The thermal insulation piece and its unions to the hot stick and the end tool are protected by the cover (9) which is made of silicon rubber appropriate for the intended use. It may have sheds (13) and it covers mainly the transition between the stick (2) and the lengthening insulator (1).

Disclosed is a high temperature hot stick device comprising a foam filled fiberglass pole with a top and a bottom; a thermal insulation part with 2 ends with a first end mounted on the top of the pole; and an end tool mounted on top of a second end of the thermal insulating part.

In one embodiment the thermal insulating part is comprised of Polyether Ether Ketone (PEEK) and includes 30% fiberglass reinforcement. The length of the thermal insulating part is created to reduce the temperature at the second end of the thermal insulating part to be a maximum of 80 degrees Celsius when the first end is at 250 degrees Celsius.

In one embodiment the hot stick further comprises a cover over a transition from the fiberglass pole to the thermal insulating part and the transition from the thermal insulating part to the end tool. Sheds (13) can be added to the cover (9). The cover (9) can made of any material such as silicone which is capable of maintaining its integrity at temperatures of at least 250 degrees Celsius.

The thermal insulating part can also be comprised of glass and the length of the thermal insulating part designed to reduce the temperature at the second end of the thermal insulating part to be a maximum of 80 degrees Celsius when the first end is at 250 degrees Celsius. The following are possible processes for creating a hot stick suitable for use in high conductor temperature applications.

One embodiment of a possible process for creating a hot stick is:

- selecting a foam filled fiberglass pole and creating a recess in a top end of the pole by removing the foam from the top end of the pole to a depth of 2 times an external diameter of the pole;
- sealing a top of the foam in the top end of the pole;
- creating a thermal insulating part with a first end whose external diameter is designed for insertion into the recess in the top end of the pole, and a second end of the thermal insulating part designed for insertion into a recess in an end tool;
- inserting the first end of the thermal insulating part into the pole and securing it to the pole; and inserting the second end of the thermal insulating part into the end tool and securing it to the end tool.

Figure 2:
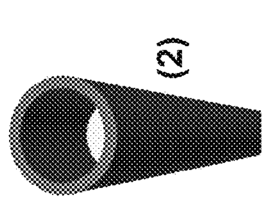
FIG. 2 is a regular epoxy fiberglass tube (2) with part of its foam removed
Figure 3:
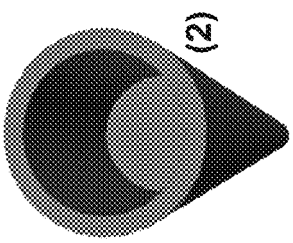
FIG. 3 is a tube (2) as per FIG. 2 sealed with epoxy resin
Figure 4:
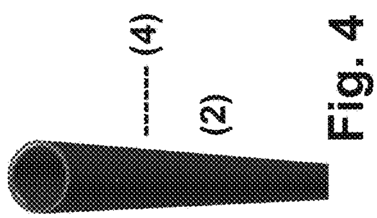
FIG. 4 is a temporary venting hole (4) in stick (2)
Figure 5:
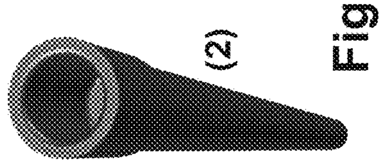
FIG. 5 is a tube as per FIG. 3 thickened in its High Voltage end
Figure 6:
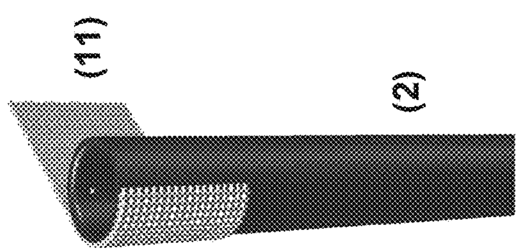
FIG. 6 is an application of fiberglass blanket (11) on the stick (2) in order to thicken the end of the tube shown in FIG. 3
Figure 7:
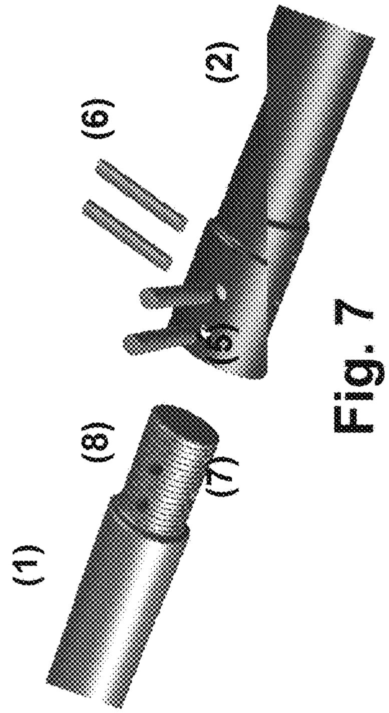
FIG. 7 is a view of the joint between the fiberglass portion (2) and the thermal insulation piece (1) including pins (6), diametrical holes (5), diametrical holes (8) and superficial groves (7)

Possible detailed processes for creating the hot stick are as follows:

1) Remove the foam at the end of a regular fiberglass rod (2) along twice the external diameter of the rod plus 1 centimeter as shown in FIG. 2. Sand the inner surface of the tube (2) so as to remove completely the foam and leave the surface rough. Stand the stick (2) vertically and seal the foam pouring epoxy resin to obtain a 4 to 5 millimeters thick layer as shown in FIG. 3. Avoid soiling the inner surface of the tube (2) with resin. If some resin adheres to the inner surface, remove mechanically the adhered material.
2) Make an air out radial orifice (4) 2 to 3 mm in diameter immediately above the resin seal as shown in FIG. 4.
3) Thicken the wall of tube (2) by 60% to 90% for a 2 diameters in length portion. The tube (2) should look like FIG. 5. There are many ways to do this. We will describe two of them. See FIG. 6.
   a) Sand the exterior surface of tube (2) of the zone where the stick shall be thickened. Apply fiberglass mat impregnated with resin (11) as shown in FIG. 6. Use the same resin as the one used to manufacture the stick and the same glass/resin ratio.
   b) Make a fiberglass tubular sleeve (12) whose interior diameter is equal to the outside diameter of stick 2. Sand its interior surface and the outside side of the stick (2) and adhere the sleeve (12) as seen in FIG. 7.
4) Make diametrical holes (5) in several planes normal to the axis of the stick (2) in the thickened part as shown in FIG. 7. Prepare plastic pins or anchor plugs (6) made of solid fiberglass 8 to 12 mm diameter.
5) Make the thermal insulation piece (1) using PEEK or other preferred material, consisting of 3 longitudinal portions with the same axis. The first portion is the one to be joined to the inner surface of the regular hot stick. The second portion is the cylinder that acts as a thermal insulation piece. The third part is the one that will hold the end tool of the composite hot stick. It can be seen in FIG. 7 that the first portion has a diameter equal to the interior diameter of the hot stick (2). The first portion of the PEEK piece (1) has circular grooves 1 to 2 mm depth, 2 mm wide and 2 mm between adjacent grooves or a similar pattern. It also has holes (8) that will be connected with holes (5) through the pins or anchor plugs (6) (See FIG. 7). In order to give the piece (1) a sufficiently adherent surface in its first portion, the surface in the first part should be treated with a high concentration of sulfuric acid until the surface gets coarse but the structure of the material is not affected. Care must be taken not to attack the central part of the piece. After the treatment with acid it is necessary to wash the piece vigorously with distilled pressurized water and then dry it in an oven for at least 30 minutes at a temperature between 180° C. and 200° C.
6) As an alternative to the treatment with acid the surface may be sanded and then blown vigorously with dry air.
7) The surface of the first portion of the thermal insulation piece is spread with epoxy resin taking care to cover the grooves as well. The corresponding inner surface of the stick and anchor plugs must be spread with resin too. The set can then be assembled.

Figure 8:
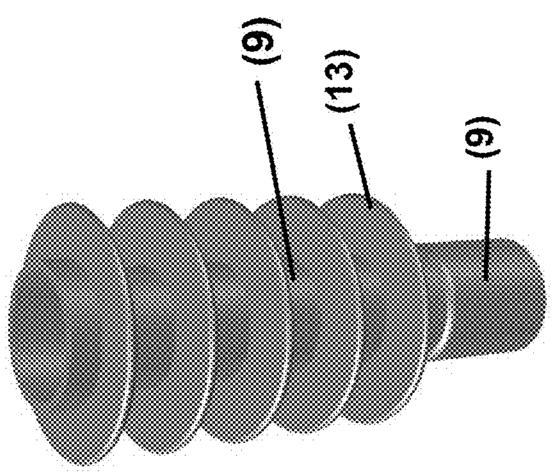
FIG. 8 is a view of the protector, the soft silicon shirt (9)

Other option is making holes (5) and (8) for the anchor plugs simultaneously with the PEEK element already adhered to the rod in its final position. The anchor plugs have to be spread with epoxy resin too.
8) Before the resin solidifies, the set must be centrifuged spinning around the axis of the stick in such a way that the resin contained in the grooves of the PEEK piece flows towards the inner surface of the fiberglass stick (2). Centrifugation should last 1 minute at 1000 RPM.
9) Seal the air out orifice and the extremes of the plugs with epoxy resin. Let the set dry and the resin harden in vertical position.
10) Install the soft silicon sleeve (9) as per FIG. 8 and FIG. 1. Do not cover the third part of the thermal insulation piece (1) yet. This silicon part is made of the same material as polymeric insulators, a widely known formula, and it must cover at least the transition area between fiberglass and PEEK in the composite stick. In the end it may cover completely the PEEK portion and the joint to the end tool. Its grade must be high dielectric strength and high temperature resistance (250° C.). Dielectric silicone grease can be used between the protector (9) and the thermal insulation piece with the purpose of reducing water absorption. The sleeve (9) increases the thermal dissipation and compensates any superficial leakage that might appear on the surface of fiberglass (2) due to the manufacturing process. The sleeve (9) performs as an extra double security component. (In case the option of a sleeve made using vulcanization is chosen, the order between this paragraph and the following one must be changed).

Figure 9:
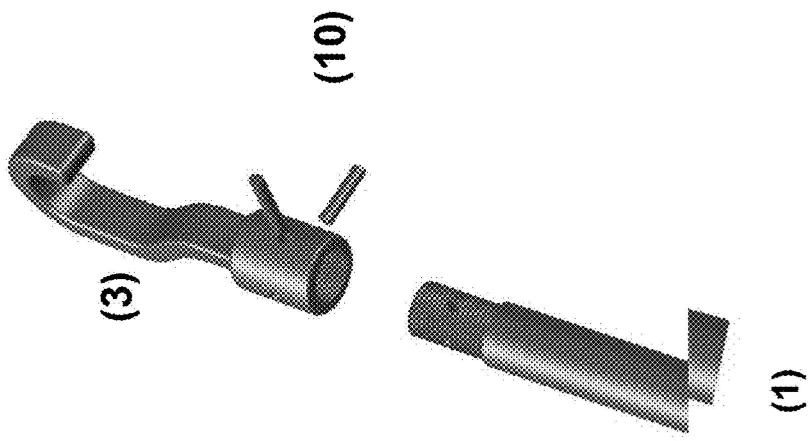
FIG. 9 is a view of an example of union between the thermal insulation piece (1) and the end tool (3)
Figure 10:
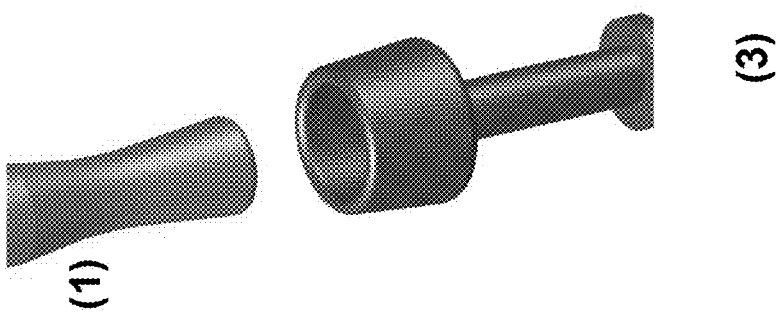
FIG. 10 is a view of another example of the union between the thermal insulation piece (1) and the end tool (3)

11) Install the end tool or fitting (3) on the hot side of the thermal insulation piece (1). In FIG. 9 a hook fitting (3) can be seen. In this case the fitting (3) is fixed to the thermal insulation piece by means of threading and the joint is improved by means of two metal pins (10). There are several solutions for this joint that come from usual plastics, aluminum and wood carpentry. These solutions must take into account the maximal working temperature of 250° C.; for instance it is not possible soldering or filling with epoxy resin.

12) For example, the following methods can be used to solve the issue of the hot side of the composite stick:
   a. Threading of the thermal insulation piece and the cap of the ferrule (See FIG. 1)
   b. Using diametrical plugs passing the PEEK piece and the ferrule (See FIG. 1 and FIG. 9)
   c. Constructing the ferrule or part of it as an extension of the PEEK part
   d. Using the compression-tension method used in regular suspension cap and pin insulators. In this case, the PEEK portion and the ferrule must be conical shaped.

Filling the gap between them with melted PEEK. Inorganic cements can be also used.

Even though the steps just described constitute a preferred method for making a hot stick for live work-high temperature conductors, it is appropriate to emphasize that the new hot stick can be made excluding one or more of the following steps:

a) Thickening the end of the fiberglass tube
b) Using of plugs crossing the fiber-PEEK transition zone
c) Making groves on the surface of the first zone of the thermal insulation piece
d) Treating the surface of the first part of the PEEK zone with any acid or solvent
e) Sanding said portion
f) Centrifugation of the stick before the hardening of the resin
g) Using silicon or other material or grease under the silicon sleeve
h) Using a silicon or other material sleeve This enhancement of regular hot sticks has other uses for live work besides holding tools or applying tension. For instance it is possible use this invention for ladders, masts, scaffolds, all of them usually made of fiberglass.

The set of tools used by a crew may include one or more sticks like the ones described herein to work on high temperature high voltage installations but it is not necessary that all the sticks are able to withstand high temperature.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

I claim:

1. A process for creating a hot stick comprising:
selecting a foam filled fiberglass pole and creating a recess in a top end of the pole by removing the foam from the top end of the pole to a depth of 2 times an external diameter of the pole;
sealing a top of the foam in the top end of the pole;
creating a thermal insulating part with a first end whose external diameter is created for insertion into the recess in the top end of the pole, and a second end of the thermal insulating part created for insertion into a recess in an end tool;
inserting the first end of the thermal insulating part into the pole and securing it to the pole; and
inserting the second end of the thermal insulating part into the end tool and securing it to the end tool.

2. A process for creating a hot stick according to claim 1 wherein the thermal insulating part is comprised of Polyether Ether Ketone (PEEK).

3. A process for creating a hot stick according to claim 2 wherein a length of the thermal insulating part is created to reduce the temperature at the second end of the thermal insulating part to be a maximum of 80 degrees Celsius when the first end of the thermal insulating part is at 250 degrees Celsius.

4. A process for creating a hot stick according to claim 1 wherein a length of the thermal insulating part is created to reduce a temperature at the second end of the thermal insulating part to be a maximum of 80 degrees Celsius when the first end of the thermal insulating part is at 250 degrees Celsius.

5. A process for creating a hot stick according to claim 4 wherein the thermal insulating part is secured to the pole using at least one plug inserted through the pole and the thermal insulating part, and the thermal insulating part is secured to the end tool using at least one plug inserted through the end tool and the thermal insulating part.

6. A process for creating a hot stick according to claim 1 wherein the thermal insulating part is comprised of glass and a length of the thermal insulating part is created to reduce the temperature at the second end of the thermal insulating part to be a maximum of 80 degrees Celsius when the first end of the thermal insulating part is at 250 degrees Celsius.

7. A process for creating a hot stick according to claim 1 further comprising creating a cover over a transition from the pole to the thermal insulating part and the transition from the insulating part to the end tool.

8. A process for creating a hot stick according to claim 7 further comprising creating sheds on the cover.

* * * * *